United States Patent [19]

Viswanathan

[11] Patent Number: 4,734,442

[45] Date of Patent: Mar. 29, 1988

[54] AMMONIA-MODIFIED POLYETHER POLYOLS AND POLYURETHANE POLYMERS PREPARED THEREFROM

[76] Inventor: Tito Viswanathan, 1818 Joyce Ct., Little Rock, Ark. 72204

[21] Appl. No.: 58,763

[22] Filed: Jun. 5, 1987

[51] Int. Cl.$^4$ ............................................. C08G 18/14
[52] U.S. Cl. .................................... 521/163; 521/164; 521/167; 527/300; 527/312; 528/76; 528/77; 528/78
[58] Field of Search ....................... 521/163, 164, 167; 527/300, 312; 528/76, 77, 78

[56] References Cited

U.S. PATENT DOCUMENTS

| | | | |
|---|---|---|---|
| 3,420,787 | 1/1969 | Reymore, Jr. et al. | 260/2.5 |
| 3,629,162 | 12/1971 | Richardson et al. | 260/2.5 |
| 3,658,731 | 4/1972 | Richardson et al. | 260/2.5 |
| 3,717,597 | 2/1973 | Hesskamp et al. | 260/2.5 |
| 4,154,931 | 5/1979 | Richter et al. | 544/315 |
| 4,459,397 | 7/1984 | Richardson et al. | 527/300 |
| 4,524,164 | 6/1985 | Viswanathan et al. | 524/14 |

OTHER PUBLICATIONS

Hustad et al., *J. Dairy Science*, 53 (1), pp. 18–24, 1969.

*Primary Examiner*—Maurice J. Welsh
*Attorney, Agent, or Firm*—Quarles & Brady

[57] ABSTRACT

The present invention relate to a method of preparing a novel polyurethane polymer having good flame-retardent qualities from an ammonia-modified polyether polyol. The preferred method comprises treating a reducing sugar with an epoxide to form a polyether polyol which is then treated with ammonia, which reacts with the polyol chemically and becomes chemically bound thereto. The ammonia-modified polyether polyol is then reacted with an isocyanate to form a fire-resistant polyurethane.

10 Claims, No Drawings

AMMONIA-MODIFIED POLYETHER POLYOLS AND POLYURETHANE POLYMERS PREPARED THEREFROM

TECHNICAL FIELD

The present invention relates to flame-retardant rigid, low-density polyurethane foams and to modified polyether polyols for use in the manufacture of such polymers.

BACKGROUND OF THE PRIOR ART

Polyurethane polymers are conventionally prepared by the reaction of an organic polyol or polyether polyol with an organic polyisocyanate. The rate of the reaction is controlled by adding catalysts such as triethylamine, triethylene diamine or other amine catalysts. Other optional ingredients in the foam formulation include blowing agent(s), surfactant(s) and flame retardant(s).

Rigid polyurethane foams can be made of polyether polyols that are prepared using sucrose, sorbitol and methylglucoside. Sucrose is the preferred sugar for this purpose because of its availability and low cost.

The milk sugar, lactose, has also been shown to be usable in making polyurethane foams. Whey powder, containing lactose as the polyhydroxy compound, in DMSO, has been used in conjunction with polyisocyanate, catalyst and blowing agent to make polyurethane foams (U.S. Pat. No. 3,658,731). The foams, however, have highly opened cell structures and low compressive strength. (See Hustad, G. O., Richardson, T., and Amundson, C. H. (1970), J. Dairy Science 53 (1), 18–24 for additional information).

The DMSO can be omitted from the formula when the whey substitution is limited to about 80% (preferably in the range of 50–60%)-the remaining being a conventional sucrose-based polyol (U.S. Pat. No. 3,629,162). However, the properties of the product are inferior to the foams prepared from formulations using no lactose additives. In addition, polyol formulations using insoluble lactose additives are highly susceptible to settling and abrasive to mixing head, pumps and pressure regulating valves of dispensing equipments.

The substitution of lactose for sucrose in propoxylation reactions leads to side reactions as the result of the action of the required base and heat on lactose. These side reactions result in dark polyol preparations. The crude lactose-based polyol preparations are high in carbonyl content—a feature that was made use in the covalent incorporation of urea in the polyol preparation by heating the two ingredients together. The polyurethane foams prepared using urea-modified polyethers exhibit improved flame-retardant qualities over conventional sucrose based foams (U.S. Pat. No. 4,459,397).

Other patents suggest that urea be mixed mechanically with polyurethane foams to produce self-extinguishing foams. For example, the Hesskamp, U.S. Pat. No. 3,717,597 discloses a self-extinguishing composite material including bits of polyurethane foam mechanically mixed with urea and bound together to form a self-extinguishing composite material.

Difficulties have been encountered when attempts have been made to incorporate solid urea in conventional polyols prior to mixing with isocyanate to form the polyurethane polymer. The dispersed granular urea in the liquid polyol leads to abrasion and increased wear of pumps, pipes and nozzles used to dispense the material. U.S. Pat. No. 3,420,787 (Reymore, et al.) and U.S. Pat. No. 4,154,931 (Richter, et al.) disclose methods of incorporating substituted ureas and cyclic ureas as extenders in polyurethane formulations for making polyurethane foams having improved flame retardancy. Other substances such as antimony oxide powder or phosphorus powder also have been used to increase flame retardancy; however, loose particles can render the foam powdery leading to unsatisfactory quality in many applications. It obviously would be desirable to be able to make polyurethane foams of improved flame retardancy without using solid urea, substituted or cyclic urea, antimony oxide or phosphorus powder.

SUMMARY OF THE INVENTION

The present invention relates generally to a method for making a modified polyether polyol for use in the manufacture of polyurethane polymer having improved fire-resistant quality. The inventive method basically comprises of reacting a reducing sugar, such as lactose, with an epoxide, such as propylene oxide, to produce a polyether polyol and reacting the polyether polyol with ammonia, preferably in the gaseous form, to form an ammonia-modified polyether polyol. The ammonia-modified polyether polyols thus obtained may be used to prepare polyurethane polymers with improved fire-resisting qualities.

A primary object of the invention is to disclose a method of preparing an ammonia-modified polyether polyol that can be used to make polyurethane polymers having improved fire-resisting qualities.

Another object is to provide an improved method of preparing a modified polyether polyol without using solid urea.

Yet another object is to produce a polyether polyol having a low viscosity that does not readily settle over an extended period of time and which allows for convenient handling.

A further object of the invention is to produce an improved fire-resistant polyurethane foam which contains little or no amounts of added powdered phosphorus or halogen-containing flame retardants.

Still another object is to disclose a polyol which permits easy processing and handling and does not subject nozzles and other handling devices for moving or processing the polyol to stoppage or abrasion resulting from suspended granular material.

Finally, the invention discloses a productive and practical method of using surplus whey/lactose resulting from cheese manufacture.

The advantages of the present invention are not realized in the prior art methods employing urea because in the prior art method the solid urea has to be added to the crude polyol preparation. This requires that the hot reactor be opened after the propoxylation of the whey/lactose so that the solid urea can be added to the reaction mixture and heated till the urea has reacted. The amount of urea to be added to the crude polyol preparation is limited to 15% final concentration. In some cases, due to insufficient reactivity with the crude preparation or the addition of excess urea, precipitation occurs at the bottom of the reaction vessel. This is a distinct disadvantage because the solid has to be removed from the vessel prior to propoxylation of the next batch of sugar. The presence of urea during propoxylation also can lead to the formation of a large amount of dark insoluble solid at the end of the reaction period which results in a product that generates inferior quality foams.

In the method of the present invention the disadvantages associated with use of urea are avoided by adding an effective amount of liquid or gaseous ammonia to the crude polyol preparation to obtain the desired degree of pH and nitrogen content. The process results in the chemical reaction of the ammonia with the polyol, such as by cross-linking, to cause an increase in viscosity without precipitation of any granular material as can occur with the use of urea. The pH of the polyol preparation may then be adjusted if desired. The structure of the polymers polyol obtained is distinctly different than the polymer made with solid urea because urea has two different amino groups that ammonia lacks.

In the preferred embodiment of the invention, lactose present in whey permeate is reacted with an epoxide, such as propylene oxide, in a ratio of about 1:3-5 at a temperature of about 80° C. to about 130° C. in the presence of an alkali, such as KOH for up to 20 hours in an airtight stirred reaction vessel under pressure. The polyether product of the propoxylation is reacted with ammonia, preferably gaseous ammonia, at a temperature of about or above 80° C. to 100° C. until the reaction is complete. The ammonia is added until the desired nitrogen content is obtained, the pressure no longer decreases and the viscosity has been increased by cross-linking. The viscosity will usually be less than that of sucrose based polyethers. The ammonia is added to the reaction vessel through an inlet port without having to open the reaction vessel.

If desired, solid urea can be added to the polyurethane formulation in amounts small enough not to cause the prior art problems associated with the use of urea.

In addition to lactose or lactose containing sources, other reducing sugars, such as maltose, glucose, galactose and mixtures thereof, can be used.

The ammoniated polyether polyol obtained as described above may be reacted with a diisocyanate, such as p,p$^1$-diphenylmethane diisocyanate, and a commercially available amine catalyst, such as (DABCO 8020), to prepare a one-shot, rigid polyurethane foam. The foaming agent used can be a blowing agent, such as $CCl_2F_2$, with a silicone surfactant being present to affect cell structure. The foams can be made with or without additional flame retardants. The flame retardancy can be evaluated by conventional tests. The general procedures for making the polyurethanes and the concentrations of ingredients that may be used are those described in U.S. Pat. No. 4,459,397. Other conventional methods can also be used to prepare polyurethanes using the polyether polyols of the present invention.

It will be readily apparent to those skilled in the art that the description given has been for illustration only and that it is not intended to limit the invention. The only proper limitations on the invention are those contained in the claims which follow.

I claim:

1. A method for making an ammonia-modified polyether polyol for use in the manufacture of polyurethane polymer having improved fire-resisting qualities, said method comprising:
    (a) reacting a reducing sugar with an epoxide to produce a crude polyether polyol; and
    (b) then reacting the polyether polyol with an effective amount of gaseous or liquid ammonia to chemically bind the ammonia to the polyol to produce an ammonia-modified polyether polyol.

2. Method of claim 1 wherein the reducing sugar is selected from the group consisting of lactose, maltose, glucose, galactose and mixtures thereof.

3. The method of claim 1, in which the step of reacting the polyether polyol with ammonia includes injecting ammonia gas in to the reaction vessel until no further reaction occurs as evidenced by no further decrease in pressure when ammonia is allowed to react with the crude polyether polyol.

4. The method of claim 1 in which solid urea is added to the polyether polyol with the ammonia.

5. A method of making a polyurethane polymer having improved fire-resisting qualities comprising the steps of:
    (a) reacting a reducing sugar with propylene oxide to produce a polyether polyol;
    (b) reacting the resulting polyether polyol with ammonia gas to produce a modified polyether polyol; and
    (c) treating the modified polyether polyol with a reactive polyisocyanate to produce the desired polyurethane polymer.

6. The method of claim 5 wherein the reducing sugar is a sugar selected from the group consisting of lactose, maltose, glucose, galactose and mixtures thereof.

7. The method of making polyether polyols comprising the following steps:
    (a) reacting of lactose with propylene oxide at a temperature between 80° to 120° C.;
    (b) adding up to 15% by weight of the mixture of urea to the crude polyol preparation;
    (c) adding ammonia to the mixture to form ammonia-modified polyether polyols.

8. The method of claim 7 where the ammonia is added as aqueous ammonia.

9. The method of claim 7 where the ammonia is added as gaseous ammonia.

10. A polyurethane prepared by the method of claim 5.

* * * * *